(12) United States Patent
Xu et al.

(10) Patent No.: US 11,708,619 B2
(45) Date of Patent: Jul. 25, 2023

(54) METHOD AND DEVICE FOR REDUCING AND HOMOGENIZING RESIDUAL STRESS OF A COMPONENT

(71) Applicant: BEIJING INSTITUTE OF TECHNOLOGY, Beijing (CN)

(72) Inventors: Chunguang Xu, Beijing (CN); Peng Yin, Beijing (CN); Yuren Lu, Beijing (CN); Jianfeng Song, Beijing (CN); Peilu Li, Beijing (CN); Dezhi Li, Beijing (CN); Zhaowei Miao, Beijing (CN)

(73) Assignee: BEIJING INSTITUTE OF TECHNOLOGY, Beijing (CN)

( * ) Notice: Subject to any disclaimer, the term of this patent is extended or adjusted under 35 U.S.C. 154(b) by 102 days.

(21) Appl. No.: 16/796,542

(22) Filed: Feb. 20, 2020

(65) Prior Publication Data
US 2020/0270712 A1    Aug. 27, 2020

(30) Foreign Application Priority Data

Feb. 21, 2019 (CN) .......................... 201910130478.9
May 9, 2019 (CN) .......................... 201910386436.1
May 10, 2019 (CN) .......................... 201910389855.0

(51) Int. Cl.
*C21D 1/04* (2006.01)
*C21D 10/00* (2006.01)
(Continued)

(52) U.S. Cl.
CPC .................. *C21D 1/04* (2013.01); *B23P 9/04* (2013.01); *C21D 10/00* (2013.01); *G10K 15/043* (2013.01); *B23P 2700/01* (2013.01)

(58) Field of Classification Search
CPC ... C21D 1/04; C21D 10/00; B23P 9/04; B23P 2700/01; G10K 15/043
See application file for complete search history.

(56) References Cited

U.S. PATENT DOCUMENTS 4,349,285 A * 9/1982 Gernelle ................ B41J 19/202
                                                400/322
4,697,751 A * 10/1987 Chiba .................... C12N 1/066
                                                241/1
(Continued)

FOREIGN PATENT DOCUMENTS

CN    103045845 A    4/2013
CN    109680141 A    4/2019
(Continued)

OTHER PUBLICATIONS

Machine Translation of JP-2003028847-A (Year: 2003).*
(Continued)

*Primary Examiner* — Kevin E Yoon
*Assistant Examiner* — Ryan L Heckman
(74) *Attorney, Agent, or Firm* — John A. Miller; Shumaker, Loop & Kendrick LLP

(57) ABSTRACT

The present disclosure relates to a method for reducing and homogenizing residual stress of a component, which comprises: detecting stress value(s) of regulation portion(s) of the component; placing the component in a container containing a fluid medium so as to immerse the component in the fluid medium; emitting, by an acoustic wave generator, an elastic wave to the fluid medium in a manner of emitting towards the regulation portion(s) of the component, and determining an emitting period of time and a frequency of the elastic wave based on the stress value(s); returning to the step S1 when the emitting period of time has elapsed, until the stress value(s) is stable. The method and the device solve the problems that it is difficult to reduce and homogenize the residual stress on high-precision machined components, complex structural components, thin-walled structural components, and low-stiffness components.

3 Claims, 9 Drawing Sheets

(51) Int. Cl.
*G10K 15/04* (2006.01)
*B23P 9/04* (2006.01)

(56) References Cited

U.S. PATENT DOCUMENTS

| | | | | |
|---|---|---|---|---|
| 5,036,944 | A * | 8/1991 | Danley | G10K 15/00 73/570.5 |
| 6,203,633 | B1 * | 3/2001 | Clauer | C21D 1/00 219/121.85 |
| 2002/0100492 | A1 * | 8/2002 | Risbeck | F01D 25/002 134/1 |
| 2004/0250584 | A1 * | 12/2004 | Offer | C21D 7/04 72/56 |
| 2013/0074561 | A1 * | 3/2013 | Alberts | C21D 7/04 72/53 |
| 2013/0233040 | A1 * | 9/2013 | Butler | C21D 1/09 72/56 |
| 2018/0104743 | A1 * | 4/2018 | Horst | B29C 64/153 |
| 2019/0061104 | A1 * | 2/2019 | Sanders | B21D 26/02 |

FOREIGN PATENT DOCUMENTS

| | | | | |
|---|---|---|---|---|
| JP | 2003028847 | A * | 1/2003 | |
| WO | WO-2010081193 | A1 * | 7/2010 | A23L 3/30 |

OTHER PUBLICATIONS

7. Forrest, T. G. "From Sender to Receiver: Propagation and Environmental Effects on Acoustic Signals." American Zoologist, vol. 34, No. 6, 1994, pp. 644-654. (Year: 1994).*

8. Nijs, L., and C. P. Wapenaar. "The Influence of Wind and Temperature Gradients on Sound Propagation, Calculated with the Two-Way Wave Equation." The Journal of the Acoustical Society of America, vol. 87, No. 5, 1990, pp. 1987-1998. (Year: 1990).*

The State Intellectual Property Office of People's Republic of China First Office Action dated Feb. 25, 2020.

The State Intellectual Property Office of People's Republic of China First Office Action dated Feb. 26, 2020.

* cited by examiner

METHOD AND DEVICE FOR REDUCING AND HOMOGENIZING RESIDUAL STRESS OF A COMPONENT

CROSS-REFERENCE TO RELATED APPLICATION

This application claims priority to Chinese Patent Application No. 201910130478.9, filed on Feb. 21, 2019; Chinese Patent Application No. 201910386436.1, filed on May 9, 2019; and Chinese Patent Application No. 201910389855.0, filed on May 10, 2019, which are incorporated herein by reference in their entirety.

TECHNICAL FIELD

The present disclosure relates to the technical field of material property research, and in particular, to a method and a device for reducing and homogenizing residual stress of a component.

BACKGROUND

With the roles of aerospace industry, pressure vessel, manufacturing industry in economic development growing and significant, and rising application of various components in the realm of engineering, the requirements for the production and quality of various components are increased. The present of stress in a component directly leads to the appearance of the cracks, which induces fracture and likes. Therefore, modifying and reducing stress, whether caused in the manufacturing or operation of the component, is a subject that people focus on.

In the prior art, a natural aging method and an artificial aging method such as annealing, tempering, and vibration shock are often used to modify and reduce stress in a component. However, the natural aging method takes a fairly long time, ranging from several months to few years, thus being unsuitable for time-sensitive engineering applications. The vibration shock artificial aging method is often applied to components in form of a plate and a disk with a regular structure and flat surfaces, but it is unable to modify and reduce stress in components with intricate and fine structure, for example, intricate parts of a cabinet or a (crank)shaft in the fields of aviation, hydropower, thermal power and compressor, and it takes a long time, ranging from several days to few months, with laborious and cumbersome process, likewise being unsuitable for time-sensitive engineering applications. Annealing, tempering and likes are intricate techniques requiring a high level of thermal control by skillful technicians and a relatively long time, at least three to five days, thus making it inadequate for engineering applications with higher requirements on time, quality and cost.

Stress is generated on the surface and interior of the component during machining, casting, welding, cold working, heat treatment and the likes of the component. For a component with intricate structure, high machining precision, thin walls or low-stiffness, it will be deformed or even cracked due to the release of residual stress on the surface during serving, thereby affecting its resolution and performance. Therefore, stress control is very important for a component with intricate structure, high machining precision, thin walls or low-stiffness. Common residual stress reducing methods include natural aging, vibration aging, thermal aging (heat treatment), contact high-energy acoustic beam regulation and likes. Natural aging is simple but requires long time with low efficiency. Vibration aging releases and reduces the residual stress inside a component by means of resonating the component by a vibration exciter. For components with high machining precision, intricate structure, irregular shape, thin walls, or low stiffness, vibration aging requires skillful technicians and intricate process parameters, otherwise, when undergo resonating, the component will suffer fatigue or even damage due to improper excitation point and parameters. Thermal aging, i.e., annealing, if the parameters in heating, holding and cooling periods are not selected properly, often fails to reduce stress, and even leads an increase in stress deformation. Contact high-energy acoustic beam regulation is also not suitable for components with high matching precision, thin-walled structure and low-stiffness, since it would require a dedicated designed acoustic wedge for coupling if such components are modified, this brings a cost. Furthermore, for components with thin-walled structure or low-stiffness, energy field of the emitted high-energy acoustic beam is so large, up to hundreds of megapascals, that the thin-walled structural or low-stiffness component to be damaged.

SUMMARY

The present disclosure provides a method and a device for reducing and homogenizing the residual stress of a component, so as to solve the problem that it is difficult to reduce and homogenize the residual stress on a high-precision machined component, an intricate structural component, a thin-wall structural component and a low-stiffness component, thereby improving the precision and stability of the component.

A first aspect of the present disclosure is to provide a method for reducing and homogenizing residual stress of a component, comprising the following steps:

a step S1 of detecting stress value(s) of regulation portion(s) of the component;

a step S2 of placing the component in a container containing a fluid medium so as to immerse the component in the fluid medium;

a step S3 of emitting, by an acoustic wave generator, a high-energy elastic wave to the fluid medium in a manner of emitting towards the regulation portion(s) of the component, and determining an emitting period of time and a frequency of the elastic wave based on the stress value(s); and a step S4 of returning to step S1 when the emitting period of time has elapsed, until the stress value(s) is stable.

In some embodiments, the elastic wave comprises a high-energy elastic wave or an ultrasonic wave.

In this way, the method for reducing and equalizing the residual stress of a component provided in the present disclosure reduce and homogenize residual stress of a component having high machining precision, intricate structure, irregular shape, thin walls and/or low stiffness in an effective and time-efficient manner without diminishing or damaging the structure or physical property of the component. Furthermore, due to the accessible steps, in particular of comparing the detected stress value(s), no special technician is required to perform the method, making this method broadly suitable for various engineering application.

In some embodiments, the elastic wave is the ultrasonic wave, and in the step S3, the ultrasonic wave is controlled to focus in the fluid medium to form a high-energy acoustic beam so as to emit towards the regulation portion(s) of the component by means of scanning of focusing.

In some embodiments, multiple acoustic wave generators are provided so as to emit ultrasonic waves from different angles towards the regulation portion(s) of the component, respectively.

In some embodiments, the elastic waves are the ultrasonic wave and a frequency of the ultrasonic wave is in a range of 10-30 kHz.

In some embodiments, a pressure in a range of 0.1-1 MPa is continuously applied to the fluid medium in the container, and/or a temperature in a range of 35-45° C. is continuously applied to the fluid medium in the container.

In some embodiments, the elastic wave is a high-energy elastic wave, and a frequency of the high-energy elastic wave is in a range of 10-40 kHz.

In some embodiments, a pressure in a range of 15-40 MPa is applied to the fluid medium in the container, and/or a temperature in a range of 20-80° C. is applied to the fluid medium in the container.

The second aspect of the present disclosure is to provide a device for reducing and homogenizing residual stress of a component, comprising:

a container containing a fluid medium;

a member for suspending the component in the fluid medium;

a plurality of acoustic wave generators arranged at different positions on a surface of the container for emitting elastic waves to the fluid medium; and a control device for controlling directions, period of time and frequencies of the elastic waves emitted by the acoustic wave generators.

In some embodiments, the elastic waves emitted by the acoustic wave generators are ultrasonic waves, and acoustic wave generators arranged in an array are provided on each of a container wall and a container bottom of the container to form a 3D spatial acoustic beam array.

In some embodiments, the array includes a square array, a circular array, a triangular array or a annular array.

In some embodiments, each elastic wave signal constituting the array is emitted to the regulation portion(s) of the component in a manner of scanning of focusing by the following control method(s):

for each elastic wave signal constituting the array, a time of arrival of the ultrasonic wave front at a certain position in the space is controlled by a time difference of the signals to achieve the focusing; and/or for each elastic wave signal constituting the array, a time of arrival of the ultrasonic wave front at a certain position in the space is controlled by an excitation phase difference of the signals to achieve the focusing.

In some embodiments, the elastic waves emitted by the acoustic wave generators are ultrasonic waves, and each of the acoustic wave generator comprises a ultrasonic transducer, and an amplitude-adjusting pole arranged towards the regulation portion(s) of the component, wherein one end of the pole is connected to the ultrasonic transducer and the other end of the pole is immersed in the fluid medium.

REFERENCE SIGNS

10—fluid medium;
20—component;
21—regulation portion(s);
30—elastic wave field;
40—container;
41—container wall;
42—container bottom;
43—container lid;
50—acoustic wave generator;
51—acoustic wave generator power supply;
52—ultrasonic transducer;
521—piezoelectric member;
53—amplitude-adjusting pole;
531—upper end surface;
532—lower end surface;
54—high-energy ultrasonic transducer;
60—auxiliary device;

70—oscilloscope;
80—cavitation bubbles;
90—aluminum alloy plate;
91—upper welding seam;
92—lower welding seam;
93—left welding seam;
94—right welding seam;
100—fixture;
200—controller;
300—3D spatial acoustic beam array;
310—first high-energy ultrasonic transducer array;
320—second high-energy ultrasonic transducer array;
400—heater;
500—pressure pump.

The figures herein are incorporated into the description and constitute a part of the description, illustrate embodiments of the present disclosure, and serve to explain the principles of the present disclosure together with the description.

DETAILED DESCRIPTION

The following further describes the present disclosure in detail by specific embodiments with reference to the accompanying figures.

Figure 1:
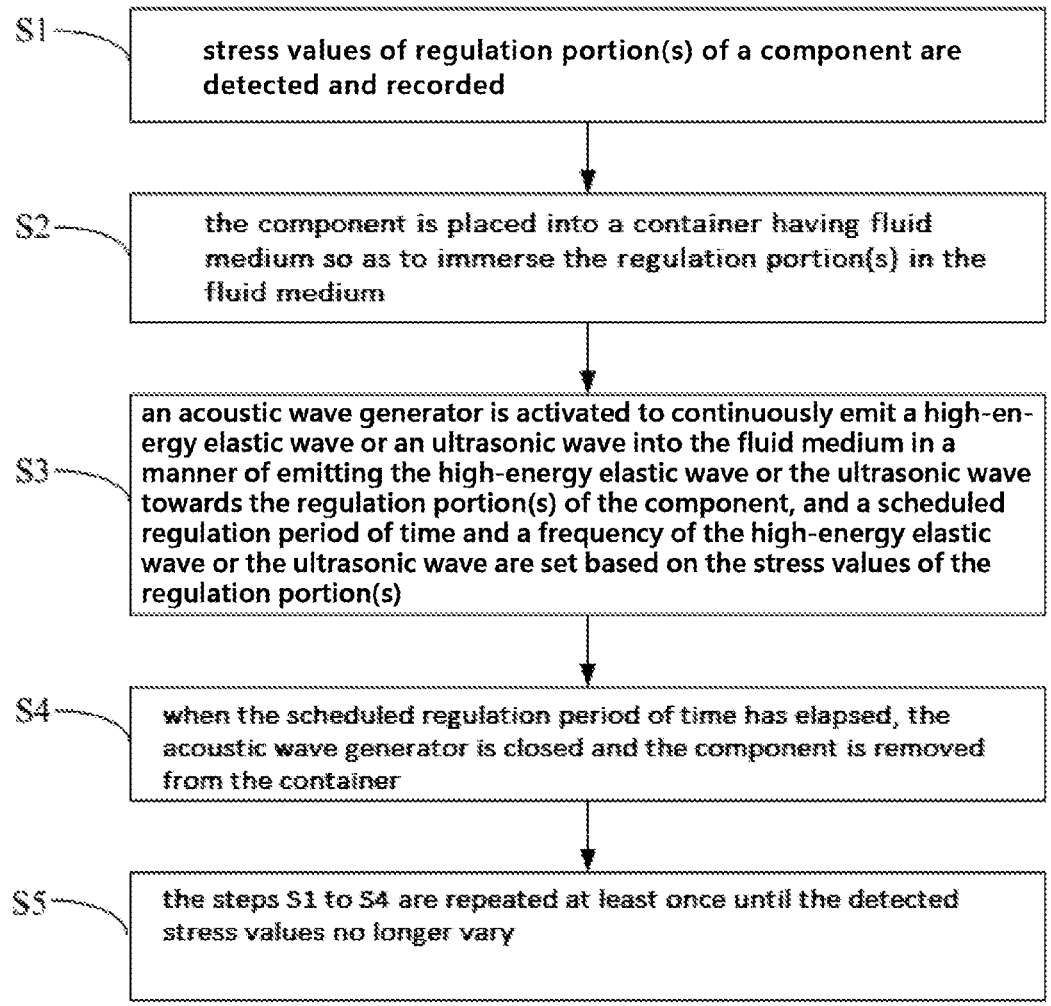
FIG. 1 is a flowchart of a method for reducing and homogenizing residual stress of a component according to an embodiment of the present disclosure.

As shown in FIG. 1, an embodiment of the present disclosure provides a method for reducing and homogenizing residual stress of a component, which comprises steps S1, S2, S3, S4 and S5.

In the step S1, stress values of regulation portion(s) of a component are detected and recorded.

In the step S2, the component is placed into a container having fluid medium so as to immerse the regulation portion(s) in the fluid medium.

In the step S3, an acoustic wave generator is activated to continuously emit a high-energy elastic wave or an ultrasonic wave into the fluid medium in a manner of emitting the high-energy elastic wave or the ultrasonic wave towards the regulation portion(s) of the component, and a scheduled regulation period of time and a frequency of the high-energy elastic wave or the ultrasonic wave are set based on the stress values of the regulation portion(s).

In the step S4, when the scheduled regulation period of time has elapsed, the acoustic wave generator is closed and the component is removed from the container.

In the step S5, the steps S1 to S4 are repeated at least once until the detected stress values no longer vary.

Figure 2:
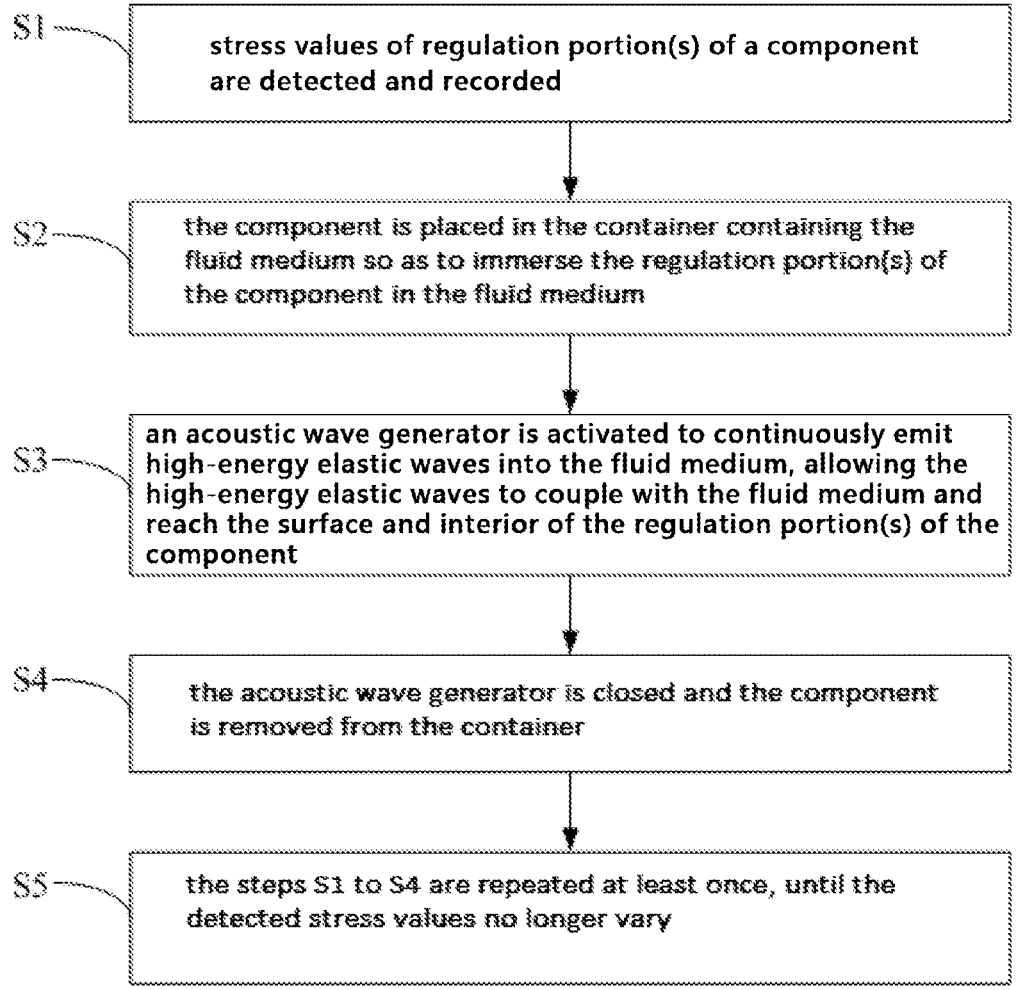
FIG. 2 is a flowchart of a method for reducing and homogenizing residual stress of a component according to a further embodiment of the present disclosure.
Figure 3:
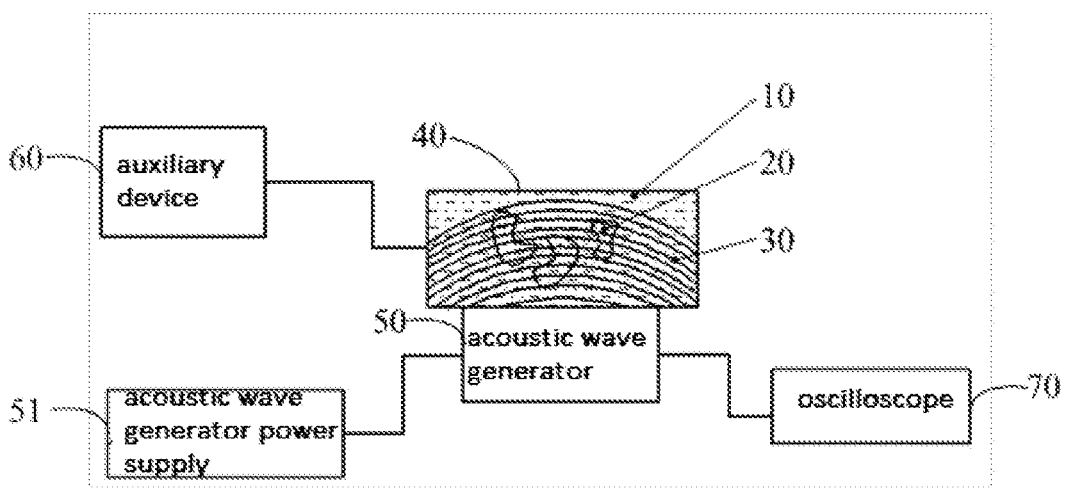
FIG. 3 is a structural schematic diagram of a regulation device according to an embodiment of the present disclosure.

A specific embodiment is described as follows. As shown in FIG. 2 and FIG. 3, a method for reducing and homogenizing residual stress of a component and a regulation device applying the same are provided according to an embodiment of the present disclosure. As shown in FIG. 3, the regulation device comprises a container 40 for placing a fluid medium 10 and a component 20 to be regulated. Examples of the container 40 may be, but not limited to, any of a pipe-like container, a closed pressured container, and an open container. The material and shape of the container 40 are not limited herein, and the material of the container 40 may be metal or non-metal, as long as the container 40 is able to hold the fluid medium 10 and the component 20 without having destructive reaction with the fluid medium 10, the component 20 and high-energy elastic wave or ultrasonic wave. The regulation device further comprises an acoustic wave generator 50, an emitting end of which is coupled with the container 40. The couple interface is coated with a couple agent so that the high-energy elastic wave is emitted into the fluid medium 10 in the container 40. The acoustic wave generator 50 may include, but is not limited to, acoustic wave, elastic wave or vibration generated by physical or chemical principles such as piezoelectric effect, magnetostrictive effect, electromagnetic effect, eddy current effect, mechanical shock, mechanical vibration, laser impact effect, mass body impact effect or the like. The regulation device further comprises an oscilloscope 70 connecting with the acoustic wave generator so as to present, in real time, the real-time status of the high-energy elastic wave for facilitating adjustment.

As shown in FIG. 2, the method for reducing and homogenizing residual stress of a component according to the embodiment of the present disclosure comprises steps S1, S2, S3, S4 and S5.

In the step S1, stress values of regulation portion(s) of the component 20 are detected and recorded.

In this step, magnitudes of residual stress existed in the regulation portion(s) of the component 20, that is, initial conditions of the residual stress of the regulation portion(s) of the component 20, are determined based on the detected stress values. The residual stress values detected every time after this can be compared with the residual stress values before regulation. In this respect, the ability of the high-energy elastic wave to reduce and homogenize the residual stress of the component, on one hand, is evaluated. On the other hand, it can also determine whether the regulation is in a normal operating state according to the change of the stress values, so that the regulation process can be adjusted in time.

In the step S2, the fluid medium 10 is introduced into the container 40, and the component 20 is placed in the container 40 containing the fluid medium 10 so as to immerse the regulation portion(s) of the component 20 in the fluid medium 40.

The fluid medium 10 may be any elastic fluid capable of transmitting ultrasonic energy. For example, the fluid medium 10 may be a medium mixed by any one or more liquid medium of water, oil and grease and any one or more gas medium of air, nitrogen and helium; or a medium mixed by solid medium and any one or more liquid medium of water, oil and grease; or a medium mixed by solid medium, any one or more liquid medium of water, oil and grease, and any one or more gas medium of air, nitrogen and helium. This fluid medium 10 is capable to couple well with the high-energy elastic wave and has low acoustic attenuation, good acoustic energy transmission rate and good acoustic performance, allows more and higher-energy high-energy elastic wave to be transmitted to the regulation portion(s) of the component 20 in a better, faster and more complete way in order to reduce and homogenize the residual stress of the component better and more efficiently.

In some embodiments the fluid medium is a cooling cutting fluid prepared, for example by mixing chlorinated paraffin, sulfurized oleic acid, barium petroleum sulfonate, oleic acid, triethanolamine, and mechanical oil. The cooling cutting fluid has good cooling performance, lubricity, acoustic permeability, dilutability and no oxidation, and also has the advantages of non-toxic, odorless, non-corrosive to human body and equipment, and non-polluting to the environment, thereby being suitable for the components 20 made of most metals, alloys, carbon fibers and likes.

In the step S3, the acoustic wave generator 50 is activated by turning on an acoustic wave generator power supply 51 so as to continuously emit a high-energy elastic wave into the fluid medium 10, allowing the high-energy elastic wave to couple with the fluid medium 10 and reach the surface and interior of the regulation portion(s) of the component 20.

In the step S4, the acoustic wave generator 50 is closed and the component 20 is removed from the container 40.

Generally, after the acoustic wave generator 50 is activated for a period of time, the component 10 is removed from the container 40 to detect and record the stress values of the regulation portion(s).

In the step S5, the steps S1 to S4 are repeated at least once, until the detected stress values no longer vary.

The detected stress values no longer varying means that the change of the stress values is within an allowable range. The allowable range herein is within ±5 MPa. If the stress values do not vary successively once or several times, they are determined to no longer vary, and the step S5 ends.

In the method for reducing and homogenizing residual stress of a component by high-energy elastic wave according to this embodiment of the present disclosure, the component 20 to be regulated is placed in the container 10 having the fluid medium 10, so that the regulation portion(s) of the component 20 is placed in the fluid medium 10 with the high-energy elastic wave. The elastic wave is transmitted by means of the elastic property of the fluid medium 10 and a high-energy elastic wave field 30 is formed in the fluid medium 10. The good coupling effect between the fluid medium 10 and the component 20 allows the high-energy elastic wave field 30 to reach the surface of the regulation portion(s) of the component 20 and even enter the interior of the regulation portion(s) of the component 20, thereby reducing and homogenizing residual stress of the surface and interior of the regulation portion(s) of the component 20, until the stress values of the regulation portion(s) decrease to reach an equilibrium. When the equilibrium has reached, the regulation of residual stress of the component 20 is stopped, and the acoustic wave generator 50 is closed to stop emitting the high-energy elastic wave.

Compared with the prior art, since the fluid medium 10 has good coupling effect with components 20 of various shapes, whether for a component 20 with irregular shape or a component 20 with intricate structure, this method solves the current problem being difficult to regulate and reduce residual stress of a component with intricate structure in the prior art. Due to the advantages of small amplitude, high energy, high intensity and high propagation velocity, the high-energy elastic wave is able to reduce and homogenize residual stress of a component 20 in a relative short period of time, generally ranging from tens of minutes to several hours, which saves time and effort and solves the problem of long time consuming in the prior art. In addition, the method provided in the embodiment of the present disclosure has a simple technological process readily accessible for less skillful technician. The progress of the regulation to the component 20 is controlled by means of comparison of stress values. By such accessible and workable way, it solves the problems being cumbersome and difficult to control and having high requirements for technical control ability in the prior art, thereby making the method better applicable to engineering applications.

The component 20 containing residual stress is any article of non-metal composite or metal material capable of acoustic transmission, for example, an article of steel, copper, aluminum, titanium alloy, high temperature alloy, metal matrix composite material, ceramics, glass, rubber, cement products, fiber epoxy composite materials or likes. The aforementioned intricate structural component 20 generally refers to a structurally complex and/or irregular shaped component, usually a casted or naturally formed component. This component, for example, is a metal casted part of blade, box, (crank) shaft, plate or disk in the field of aviation, hydropower, thermal power and compressor.

Figure 4:
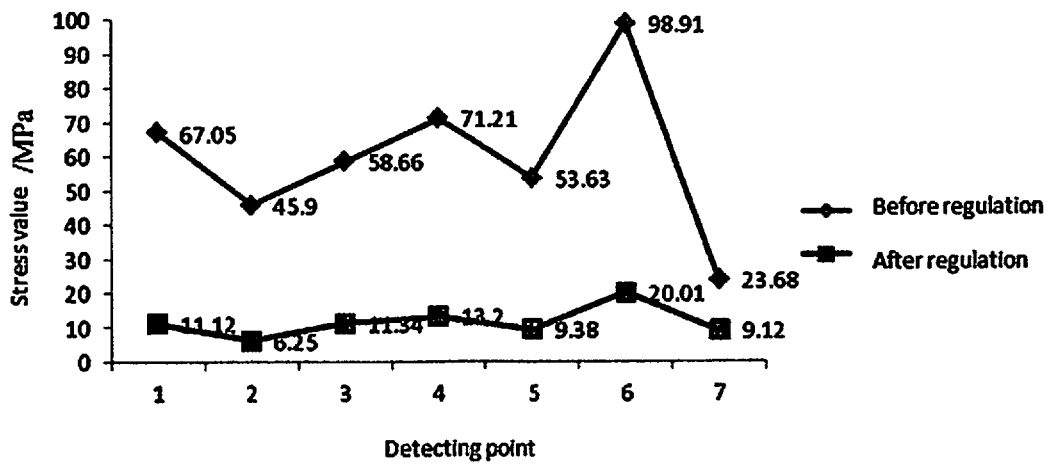
FIG. 4 is a diagram showing a comparison of circumferential residual stress values of a component before and after regulation according to an embodiment of the present disclosure.
Figure 5:
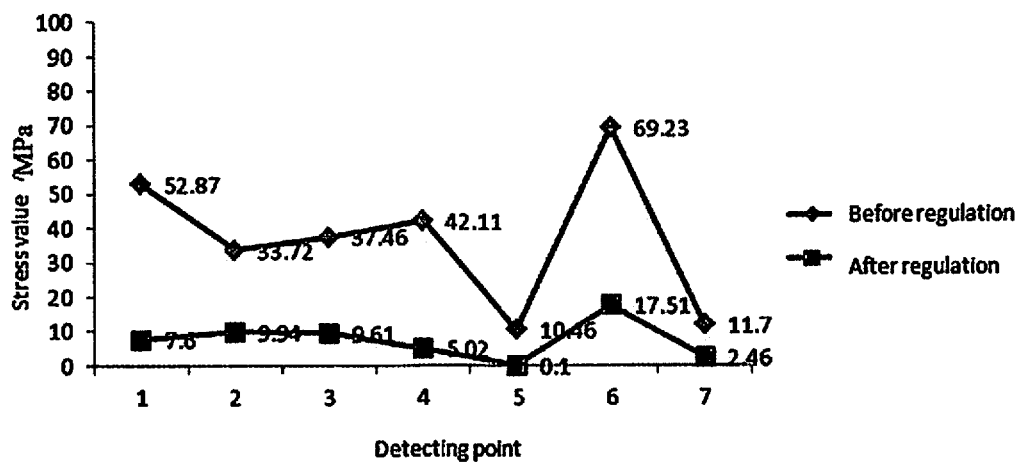
FIG. 5 is a diagram showing a comparison of axial residual stress values of a component before and after regulation according to an embodiment of the present disclosure.

FIG. 4 and FIG. 5 show, respectively, a diagram of comparison of the circumferential residual stress values corresponding to multiple detection points of a welded pipeline before and after the welded pipeline is regulated by the method for reducing and homogenizing residual stress of a component with the high-energy elastic wave according to the embodiment of the present disclosure and a diagram of comparison of axial residual stress values corresponding to multiple detection points of the welded pipeline before and after the welded pipeline is regulated by the method for reducing and homogenizing residual stress of a component with the high-energy elastic wave according to the embodiment of the present disclosure. By comparing the changes of the stress values corresponding to the detection points before and after the regulation in the diagrams, it is clear that this method has a strong potential to reduce residual stress and a strong potential to homogenize residual stress. These diagrams illustrate that the method provided in the embodiment of the present disclosure has a great potential to reduce and homogenize residual stress of a component.

In order to ensure that the high-energy elastic wave reduces and homogenizes residual stress of a component in an efficient and stable way, in some embodiments, the step S3 further comprises adjusting the frequency of the high-energy elastic wave emitted by the acoustic wave generator 50 in the range of 10 kHz~40 kHz. If the working frequency of the high-energy elastic wave is greater than 40 kHz, its working voltage and power are excessive, which may cause the voltage fail to support its normal operation and even damage the equipment such as the acoustic wave generator 50 and ultrasonic transducer. If the working frequency of the high-energy elastic wave is less than 10 kHz, its working frequency is inadequate to meet the energy requirement required for the high-energy elastic wave in the embodiments of the present disclosure, so that the effect of reducing the residual stress is poor or ineffective.

In some embodiments, in order to more effectively and economically reduce and homogenize residual stress of the component 20, the frequency value of the high-energy elastic wave used for residual stress reduction and homogenization is determined based on the stress values of the regulation positions of the component 20 before the regulation and the scheduled period of time for regulation of the residual stress of the component 20 for the current time. For example, if the stress values before regulation are large and the scheduled period of time is short, the frequency should be high, such as 35 kHz~40 kHz. If the stress values before regulation are relatively small and the scheduled period of time is longer, the frequency may be lower as 10 kHz~15 Khz. In some embodiments, the frequency is selected as 33 kHZ for the balance of efficiency and cost.

In some embodiments, as shown in FIG. 3, the regulation device may further comprise an auxiliary device 60. The auxiliary device 60, for example, may be a pressurizer and/or a heater.

In the case that the auxiliary device 60 is the pressurizer, the method may further include a step S31 before the step S4. In the step S31, the pressurizer is activated to continuously apply a predetermined high-pressure to the fluid medium 10 in the container 40. The range of the predetermined high-pressure is 15 MPa~40 MPa. Accordingly, the step S6 may further includes closing the pressurizer. The predetermined high-pressure may specifically include, but is not limited to, a pressure generated artificially, naturally or indirectly in other ways. The container 40 is preferably a closed pressure container. This closed pressure container can effectively ensure the intensity of pressure in the container 40 and ensure that the pressure does not leak. Especially in the case of combining with the pressurizer, the closed pressure container should be used so as to allow the pressurized fluid medium 10 to reduce and homogenize surface residual stress of the component in a more effective manner.

Continuously applying a high pressure within the above-mentioned high-pressure range to the fluid medium 10 can increase the pressure of the fluid medium 10, thereby increasing its density, reducing acoustic attenuation, increasing acoustic transmission efficiency, and enhancing acoustic transmission performance, which serve the purpose of propagating of high-energy elastic wave, and thus facilitating reduction and homogenization of residual stress of the component 20. If the applied pressure is higher than the range of the predetermined high-pressure, that is, the applied pressure is greater than 40 MPa, it will make the pressure value excessive, which is not only uneconomical, but also likely to damage machinery and equipment, and even cause explosion, spray and other accidents. If the applied pressure is lower than the range of the predetermined high-pressure, that is, the applied pressure is less than 15 MPa, the propagation of high-energy elastic wave may be inadequate.

In some embodiments, the predetermined high-pressure is 25 MPa, and the component 20 is an aluminum alloy article. Continuously applying this predetermined high-pressure to the fluid medium 10 allows the pressure of the fluid medium to increase moderately, the degree of acoustic attenuation reduces significantly, and the degree of acoustic propagation efficiency increases largely, thereby realizing a good propagation effect of the high energy elastic wave in an economical and cost-effective manner.

In the case that the auxiliary device 60 is the heater, the method may further include a step S32 before the step S4. In the step S32, the heater is activated to continuously apply a predetermined high-temperature to the fluid medium 10 in the container 40. The range of the predetermined high-temperature is 20° C.~80° C. Accordingly, the step S6 may further includes closing the heater. Herein, applying 35° C.~80° C. refers to applying high temperature, and applying 0° C.~35° C. (excluding 35° C.) refers to applying low temperature.

Methods for applying high temperature to the fluid medium 10 include, but are not limited to, artificial heating, radiant heating, and naturally generated high temperature or other indirect heating methods. By applying high temperature to the fluid medium 10, the particle motion of the fluid medium 10 becomes more active, so that the acoustic attenuation is reduced, the acoustic propagation efficiency is increased, and the acoustic transmission performance is enhanced, which facilitate the transmission of acoustic energy, that is, the propagation of high-energy elastic wave. As a result, the residual stress of the component 20 is reduced and homogenized in a more effective manner.

The application of low temperature to the fluid medium 10 can be achieved by using liquid nitrogen, electrons or other physical methods, and can also include, but not limited to, artificial cooling, radiation cooling, and naturally generated low temperature or other indirect cooling methods. By applying low temperature to the fluid medium 10, the density of the fluid medium 10 increases, so that the acoustic attenuation is reduced, the acoustic propagation efficiency is increased, and the acoustic transmission performance is enhanced, which facilitate the transmission of acoustic energy, that is, the propagation of high-energy elastic wave. As a result, the residual stress of the component 20 is reduced and homogenized in a more effective manner.

Whether the high temperature or low temperature in the range of the above-mentioned predetermined temperature is applied to the fluid medium 10, it improves the propagation efficiency and acoustic transmission performance of the high-energy elastic wave, and thus allows much and more complete high-energy elastic wave to reach the surface of the regulation portion(s) of the component 20 in a faster way. As a result, residual stress reduction and homogenization of the component 20 can be realized in a timely and efficient manner.

If the applied temperature is too high, that is, higher than 80° C., the piezoelectric ceramic plate of the transducer may be damaged due to overheating. If the applied temperature is too low, that is, lower than 20° C., it has a negative effect to movement activity of the fluid medium 10, making the fluid medium too viscous, greatly reducing its acoustic transmission performance.

In some embodiments the predetermined temperature is 50° C.±5° C. When this predetermined temperature is continuously applied to the fluid medium 10, the degree of its acoustic attenuation is reduced, the efficiency of its acoustic transmission is improved, and the degree of its acoustic transmission performance is increased in a desired manner. As a result, the propagation effect of the elastic wave is realized in an economical and the more cost-effective manner.

Figure 6:
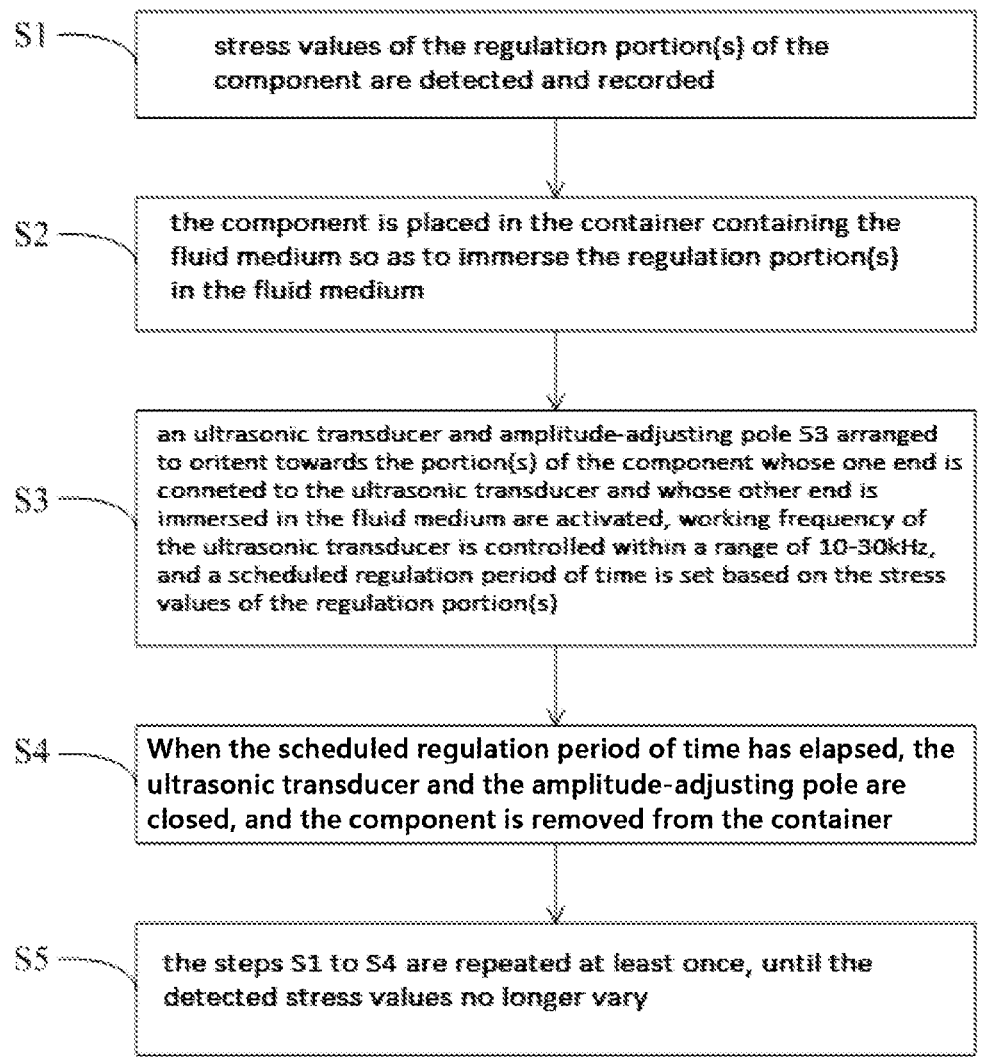
FIG. 6 a flowchart of a method for reducing and homogenizing residual stress of a component according to a further embodiment of the present disclosure.
Figure 7:
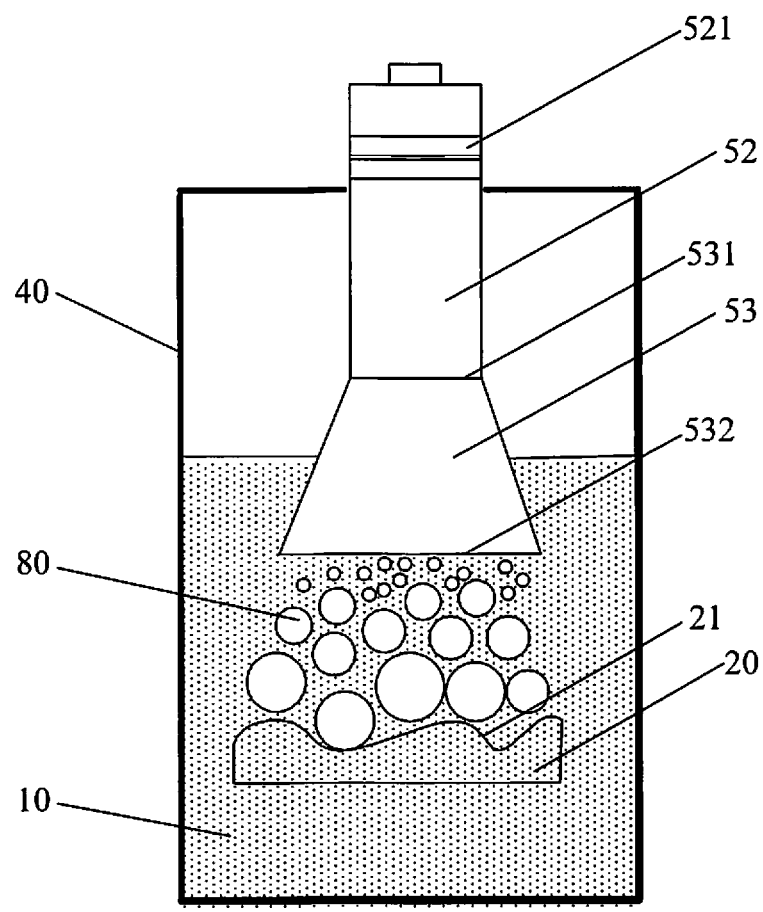
FIG. 7 is a structural schematic diagram of a device for reducing and homogenizing residual stress of a component according to an embodiment of the present disclosure.
Figure 8:
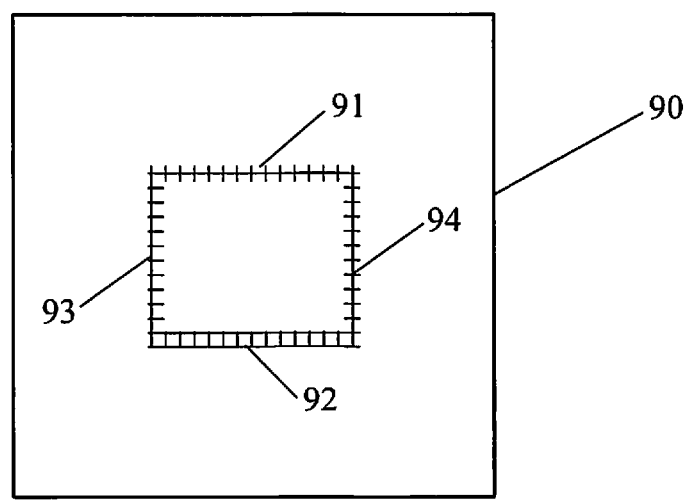
FIG. 8 is a structural schematic diagram of welding seams of an aluminum alloy plate according to an embodiment of the present disclosure.
Figure 9:
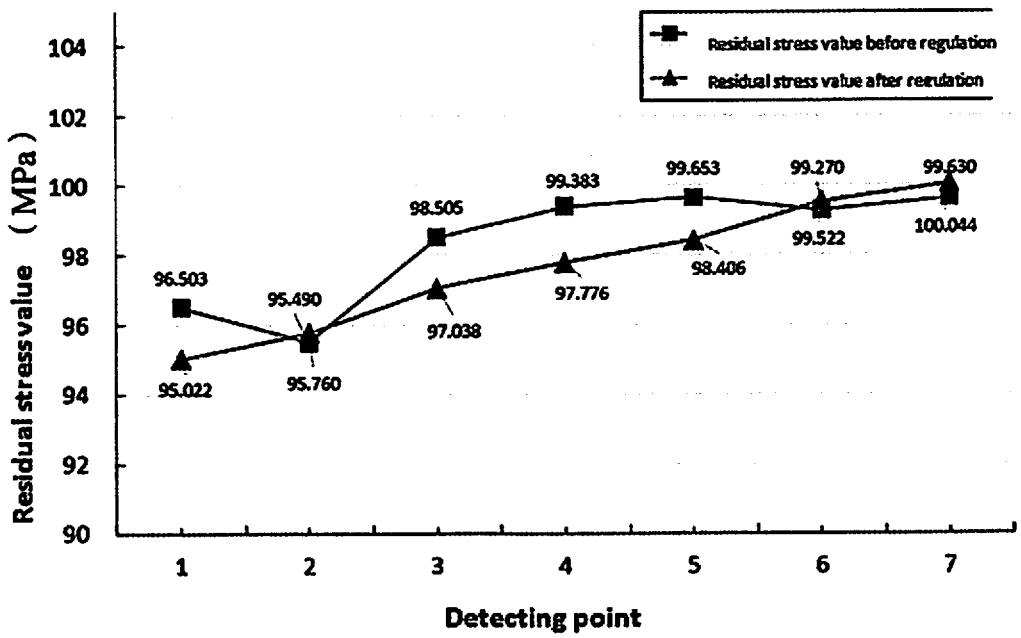
FIG. 9 is a diagram showing a comparison of residual stress values at the detecting points of an upper welding seam of the aluminum alloy plate before and after reducing residual stress according to an embodiment of the present disclosure.
Figure 10:
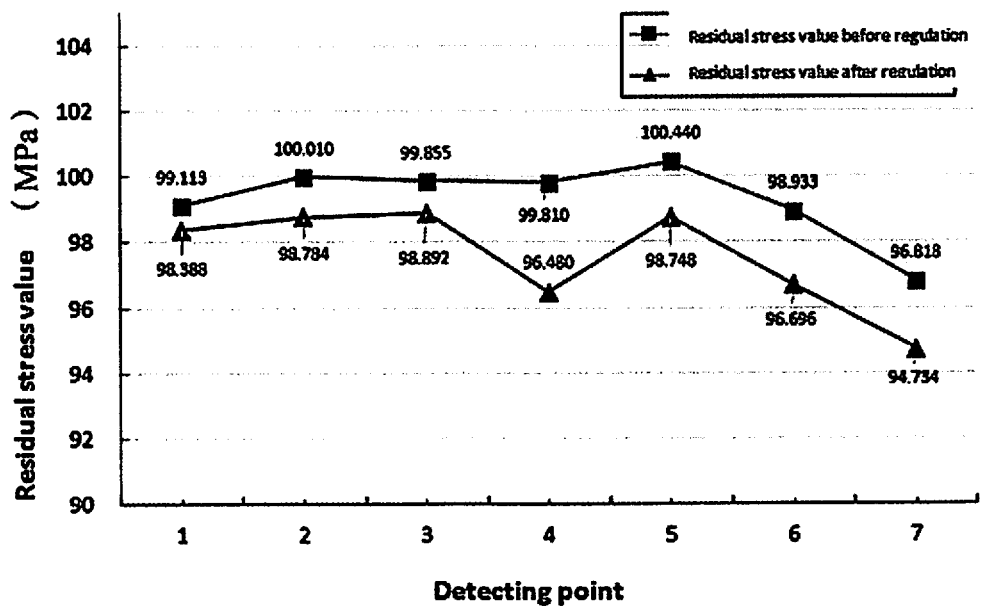
FIG. 10 is a diagram showing a comparison of residual stress values at the detecting points of a lower welding seam of the aluminum alloy plate before and after reducing residual stress according to an embodiment of the present disclosure.
Figure 11:
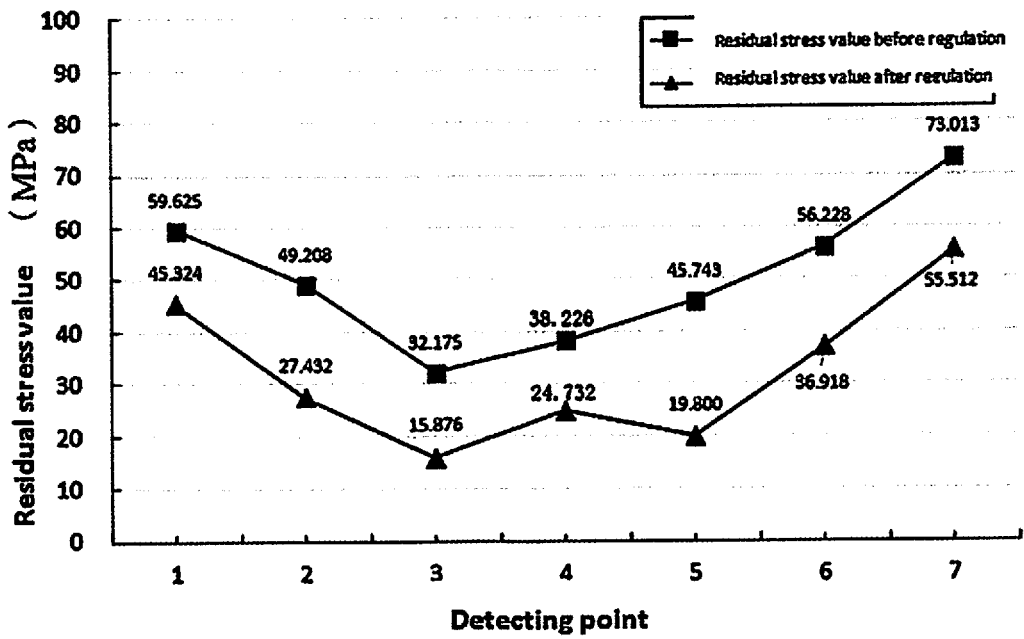
FIG. 11 is a diagram showing a comparison of residual stress values at the detecting points of a left welding seam of the aluminum alloy plate before and after reducing residual stress according to an embodiment of the present disclosure.
Figure 12:
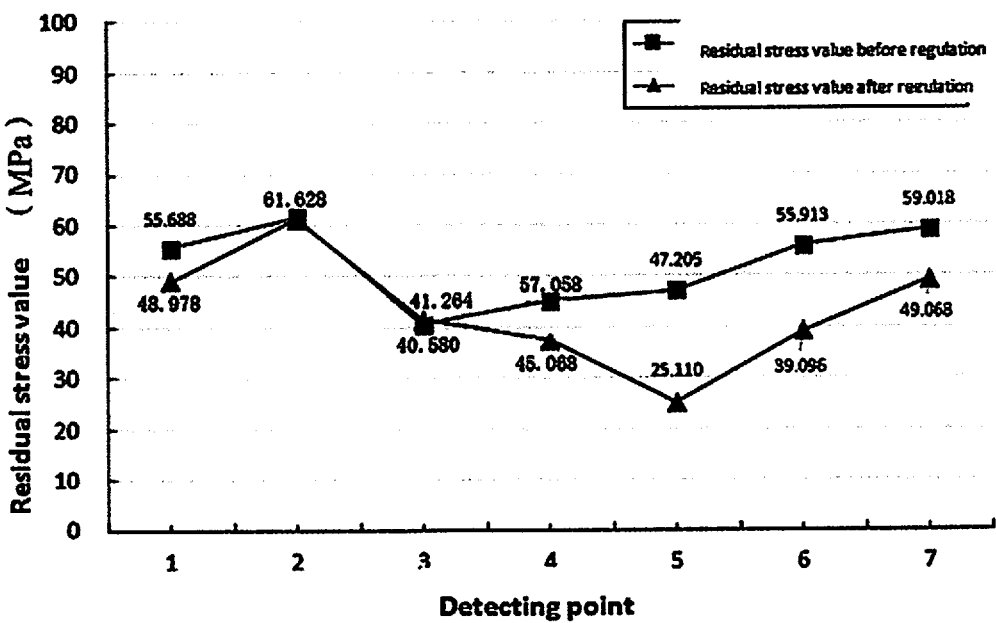
FIG. 12 is a diagram showing a comparison of residual stress values at the detecting points of a right welding seam of the aluminum alloy plate before and after reducing residual stress according to an embodiment of the present disclosure.

A further specific embodiment is described as follows. As shown in FIG. 6 and FIG. 7, a further embodiment of the present disclosure provides a method for reducing and homogenizing residual stress of a component and a regulation device applying the same. The device comprises a container 40 inside which a fluid medium 10 is contained and an acoustic wave generator 50. The acoustic wave generator 50 comprises an ultrasonic transducer 52, and an amplitude-adjusting pole 53 arranged to orient towards regulation portion(s) 21 of a component 20, wherein one end of the pole 53 is connected to the ultrasonic transducer 52 and the other end of the pole 53 is immersed in the fluid medium 10. The ultrasonic transducer 52 and the amplitude-adjusting pole 53 can be arranged to be vertically connected. The end of the amplitude-adjusting pole 53 connected to the ultrasonic transducer 52 may be an upper end surface 531, the other end of the amplitude-adjusting pole 53 oriented towards the regulation portion(s) 21 may be a lower end surface 532. An emitting outlet of the amplitude-adjusting pole 53 for emitting ultrasonic wave is arranged on the side of the lower end surface 532, and the regulation portion(s) 21 are placed below the amplitude-adjusting pole 53, so that the ultrasonic wave emitted by the emitting outlet of the amplitude-adjusting pole 53 is oriented directly to the liquid region between the pole and the surfaces of the regulation portion(s), allowing large number of cavitation bubbles 80 to break to the maximum extent on the surfaces of the regulation portion(s) 21, thereby reducing and homogenizing residual stress on the surfaces of the regulation portion(s) 21 in an efficient and effective manner.

The fluid medium 10 may specifically be a liquid fluid medium, and degassed distilled water or purified water is preferably used, because both the degassed distilled water and the purified water have the characteristics of a small viscosity coefficient, a low solubility, and a small amount of dissolved gas. The fluid medium 10 with such characteristics can easily generate cavitation, and its cavitation density can be increased. In addition to using the degassed distilled water or the purified water, other fluid media 10 having the aforementioned characteristics can also be used, and the aforementioned effects can also be achieved. In addition, the ultrasonic transducer 52 is a device capable of converting the inputted high-frequency electrical energy into mechanical energy (i.e., the ultrasonic wave) and then transmitting it, while consuming only a small part of power per se. The amplitude-adjusting pole 53 is a passive device that does not generate vibration per se, but changes the amplitude of the vibration inputted by the ultrasonic transducer 52 to increase the amplitude of the wave and then transmits it out. The component 20 may be made of metal or non-metal, with a simple and regular shape structure or a high precision machined and complex structure shape. The material and shape of the component 20 are not limited in this embodiment. However, in particular, the method and device provided in this embodiment of the present disclosure can achieve the reduction and homogenization of residual stress on the surfaces of high-precision machined components, complex structural components, thin-walled structural components and low-stiffness components.

The method provided in this embodiment of the present disclosure comprises steps S1, S2, S3, S4 and S5.

In the step S1, stress values of the regulation portion(s) 21 of the component 20 are detected and recorded.

In the step S2, the component 20 is placed in the container 40 containing the fluid medium 40 so as to immerse the regulation portion(s) 21 in the fluid medium 40.

in the step S3, the ultrasonic transducer 52 and the amplitude-adjusting pole 53 arranged towards the regulation portion(s) 21 of the component 20 whose one end is connected to the ultrasonic transducer 52 and whose other end is immersed in the fluid medium 10 are activated, working frequency of the ultrasonic transducer 52 is controlled within a range of 10-30 kHz, and a scheduled regulation period of time is set based on the stress values of the regulation portion(s) 21.

Wherein, the scheduled regulation period of time can be set based on the stress values of the regulation portion(s) 21 of the component 20, the shape/structure of the component 20 and the likes. It is desired to set this scheduled regulation period of time as accurately as possible to reduce the number of times the component is repeatedly placed in the container, preferably to one time, in order to effectively prevent the component from having a fatigue and thereby extending its service life.

In the step S4, when the scheduled regulation period of time has elapsed, the ultrasonic transducer 52 and the amplitude-adjusting pole 53 are closed, and the component 20 is removed from the container 40.

In the Step S5, the steps S1 to S4 are repeated at least once, until the detected stress values no longer vary.

The stress values no longer varying indicates that the residual stress reduction and homogenization of the component surface has been completed.

In the method for reducing and homogenizing residual stress of a component by cavitation impact according to this embodiment of the present disclosure, the regulation portion(s) 21 of the component 20 is placed in the fluid medium 10, the ultrasonic transducer 52 and the amplitude-adjusting pole 53 are activated to introduce ultrasonic wave into the fluid medium 10, and the emitting outlet of the amplitude-adjusting pole 53 is arranged to orient towards the regulation portion(s) 21, allowing the ultrasonic wave to orient directly to the liquid region between the pole and the surfaces of the regulation portion(s). The method provided in this embodiment of the present disclosure utilizes the cavitation phenomenon of ultrasonic wave in liquids. When the working frequency of the ultrasonic wave is in the range of 10 to 30 kHz, the ultrasonic wave is introduced in the fluid medium. The ultrasonic pressure causes the molecules of the fluid medium to vibrate. When a certain condition is reached, a large number of cavitation bubbles 80 are formed. These cavitation bubbles 80 undergo a primary generating-developing-rapid bursting dynamic process. When these cavitation bubbles 80 burst rapidly, micro-shock waves are generated, so that significant local pressures are formed. These micro-shock waves finally act on the surfaces of the regulation portion(s) 21, reduce and homogenized residual stress on these surfaces. And when these cavitation bubbles 80 burst and shrink to the minimum size, they start to rebound and generate impact waves. These impact waves have a greater pressure than the micro-shock waves. These impact waves also act on the surfaces of the regulation portion(s) 21, reduce and homogenize the residual stress on the surfaces. The micro-shock waves and impact waves together form a strong pressure field, which impacts on the surfaces of the regulation portion(s) 21, and generates normal stress and shear stress on these surfaces. When the stress superimposed by the normal stress, the shear stress, and residual stress on the surfaces of the component reaches or exceeds the yield limit of the component 20, microscopic plastic deformation occurs on the surfaces of the regulation portion(s) 21 of the component 20, so that the residual stress on the surfaces of regulation portion(s) 21 is reduced and homogenized, until the stress values of the regulation portion(s) 21 of the component 20 decrease to reach an equilibrium. The cavitation phenomenon refers to the local temporary negative pressure zone formed in local parts of the liquid due to a physical action such as eddy current or ultrasonic wave in the liquid, thereby causing the liquid or liquid-solid interface to break and forming a large number of tiny cavitation bubbles 80. These cavitation bubbles 80 are in an unstable state and vibrate under the effect of acoustic pressure. When the acoustic pressure reaches a certain value, a dynamic process of primary generating-developing-rapid bursting occurs. When these cavitation bubbles 80 rapidly burst, micro-shock waves are generated, which cause a large local pressure, and when these cavitation bubbles 80 burst and shrink to the minimum size, they start to rebound and generate impact waves. Compared with the micro-shock waves, the impact waves have a larger pressure. The micro-shock waves form a strong pressure field with the impact waves.

Compared with the prior art, the micro-shock waves and the impact waves generated by the method provided in this embodiment of the present disclosure can suitably impact the surface of structural components of any shape, whether the component is simple regular structural shaped or high-precision machined and complex structural shaped. In addition, the intensity of this pressure field generated by micro-shock waves and impact waves is generally about 30 to 40 MPa, which is far less than the intensity of the pressure field, about hundreds of megapascals, produced by high-energy acoustic beam in the existing contact high-energy acoustic beam regulation method. The pressure field of the strength level provided in this embodiment of the present disclosure can ensure that residual stress on the surface of the component to be regulated can be reduced and homogenized, and the thin-walled structure or the low-stiffness structure of the component is not damaged, and thus the non-destructiveness and integrity of the component are guaranteed. The method provided in this embodiment of the present disclosure solves the problem of reducing and homogenizing the residual stress on the surfaces of high-precision machined components, complex structural components, thin-walled structural components, and low-stiffness components, while keeping the precision and structural stability of these components. In addition, the scheduled regulation period of time is set according to the stress values of the component to be regulated and experiences to ensure that the scheduled regulation period of time is as accurate as possible, thereby reducing the number of times the component is repeatedly placed in the container, which effectively prevents the component from fatigue and thus extent its service life.

As shown in FIG. 8 to FIG. 12, an embodiment provided in the present disclosure is an experiment performed by using an aluminum alloy plate 90 as a component 20 as an example. It illustrates multiple comparison diagrams, each of which shows a comparison of residual stress values corresponding to multiple detecting points of the regulation portion(s) of the aluminum alloy plate 90 before and after regulation by a method for reducing and homogenizing surface residual stress by means of cavitation impact according to the embodiment of the present disclosure. The regulation portion(s) of the aluminum alloy plate 90 are welding seams of the aluminum alloy plate 90, including an upper welding seam 91, a lower welding seam 92, a left welding seam 93 and a right welding seam 94. The foregoing comparison diagrams are the comparison diagrams of residual stress values corresponding to multiple detecting points of the upper welding seam 91, multiple detecting points of the lower welding seam 92, multiple detecting points of the left welding seam 93, and multiple detecting points of the right welding seam 94 before and after the regulation, respectively. By comparing the changes of the stress values of each detecting point before and after the regulation in each figure, it can be seen that this method has a strong ability to reduce residual stress and a strong ability to homogenize residual stress, and has a significant effect on reduction and homogenization of the residual stress on the surfaces of the regulation portion(s) 21 with irregular geometric shapes.

In an embodiment the regulation device according to the present disclosure may further comprise a heater. The regulation method according to the present disclosure may further comprise a step S32 before the step S4, in which the heater is activated to continuously apply a temperature in the range of 35-45° C. to the fluid medium 10 in the container 40. The regulation method may further comprise a step S41 after the step S4, in which the heater is closed. Heating the fluid medium 10 to an appropriate temperature can increase the vapor pressure in the fluid medium, reduce the cavitation threshold, increase its stability, thereby promoting cavitation. It can also increase the volume of the cavitation bubbles 80 to obtain micro-shock waves and impact waves with greater pressure, so that a higher intensity stress response can be generated on the surfaces of the regulation portion(s) 21, and the reduction and homogenization effects are improved. Furthermore, it reduces the energy transmission loss of the ultrasonic wave, thereby improving the residual stress reduction and homogenization efficiency on the surface of the component 20.

In a further embodiment the regulation device according the present disclosure may further comprise a pressurizer. In particular, the container 40 is a closed pressure container with a gas inlet arranged on the side wall of the container, wherein the gas inlet is connected to an inlet pipe of the pressurizer. The regulation method according the present disclosure may further comprise a step S31 before the step S4, in which the pressurizer is activated to continuously apply a low pressure in the range of 0.1-1 MPa to the fluid medium 10 in the container 40, The regulation method may further comprise a step S42 after the step S4, in which the pressurizer is closed. Applying a low pressure to the fluid medium 10 can increase the vapor pressure in the fluid medium, reduce the cavitation threshold, increase its stability, thereby promoting cavitation. It can also increase the volume of the cavitation bubbles 80 to obtain micro-shock waves and impact waves with greater pressure, so that a higher intensity stress response can be generated on the surfaces of the regulation portion(s) 21, and the reduction and homogenization effects are improved. Furthermore, it reduces the energy transmission loss of the ultrasonic wave, thereby improving the residual stress reduction and homogenization efficiency on the surface of the component 20.

In a further embodiment the ultrasonic transducer 52 is provided with any one of piezoelectric member 521, magnetoelastic member, and photoelastic member that can excite high-energy elastic wave. The piezoelectric member 521 may be a piezoelectric ceramic. This high-energy elastic wave can make the amplitude of the vibration of the lower end surface 532 of the amplitude-adjusting pole 53 up to 40 microns, while the amplitude of the regular ultrasonic wave is only up to a few microns. Compared with the regular ultrasonic wave, this high-energy elastic wave has a higher acoustic intensity, which can greatly increase the maximum radius volume that a cavitation bubble 80 is able to have, and obtain micro-shock waves and impact waves with larger amplitude so that a higher intensity stress response can be generated on the surface of the component to be regulated, thereby improving the residual stress reduction and homogenization efficiency.

In some embodiment there is a gap between the end of the amplitude-adjusting pole 53 facing the regulation portion(s) 21 (that is, the lower end surface 41) and the surfaces of the regulation portion(s) 21. This gap allows a large number of cavitation bubbles 80 to burst on the surfaces of the regulation portion(s) 21, so that the micro-shock waves and impact waves generated by the bursting of the cavitation bubbles 80 reduce and homogenize residual stress on the surface of the component in a much more effective and efficient manner. In an embodiment, the voltage of the ultrasonic transducer 52 is selected as 200-500V, the diameter of the upper end surface 531 of the amplitude-adjusting pole 53 is selected as 40-70 mm, and the gap is selected as 50-150 mm.

In some embodiments the amplitude-adjusting pole 53 is a truncated cone with a diameter of the upper end surface 531 smaller than that of the lower end surface 532 thereof. In this way, the area for transmitting ultrasonic wave can be enlarged to further rapidly spread the energy of the ultrasonic wave, thereby increasing the energy of the ultrasonic waves emitted per unit time, so as to more efficiently reduce and homogenize residual stress on the surface of the component 20.

Figure 13:
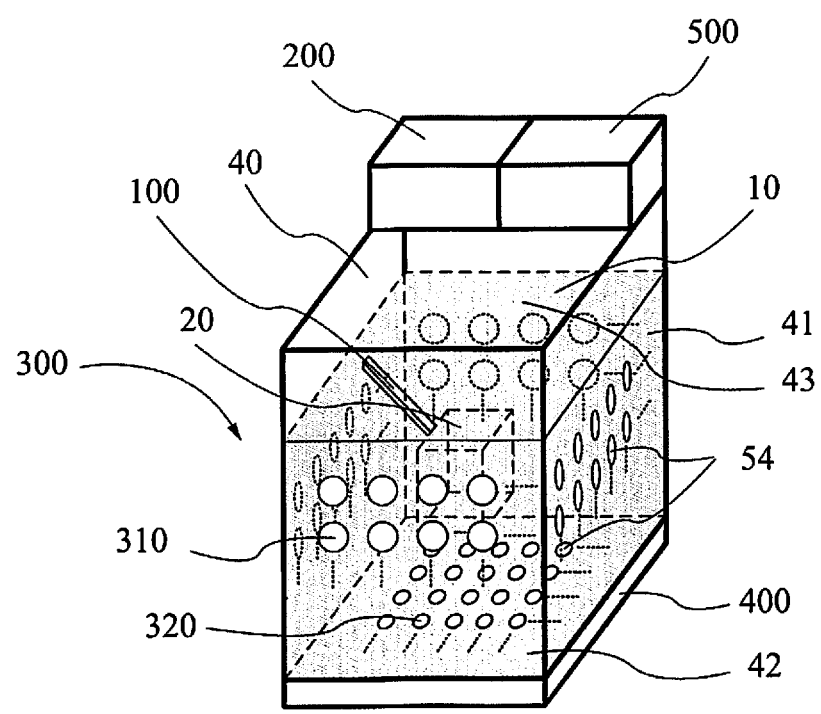
FIG. 13 is a structural schematic diagram of a device for reducing and homogenizing residual stress of a component according to a further embodiment of the present disclosure.

As shown in FIG. 13, a further embodiment of the present disclosure provides a further device for reducing and homogenizing residual stress of a component. The device comprises a closed square groove pressure container 40 consisting of a container wall 41, a container bottom 42 and a container lid 43. The container 40 holds fluid medium 10. The device further comprises several high-energy ultrasonic transducers 54 mounted on the container wall 41 and the container bottom 42. The transmitting end of each high-energy ultrasonic transducer 54 is in communication with the interior of the container 40. Some of the high-energy ultrasonic transducers 54 form a first high-energy ultrasonic transducer array 310 on the container wall 41 in an array, and other high-energy ultrasonic transducers 54 form a second high-energy ultrasonic transducer array 320 on the container bottom 42 in an array. The first high-energy ultrasonic transducer array 310 and the second high-energy ultrasonic transducer array 320 together constitute a 3D spatial acoustic beam array 300. The device further comprises a component 20 suspended in the fluid medium 10 and a fixture 100 for holding a component 20 in the fluid medium 10. A heater 400 is arranged below the container bottom 42. A pressure pump 500 is arranged above the container lid 43 for pressurizing the fluid medium 10. A controller 200 is arranged on the upper part of the container lid 43, which is electrically connected to the high-energy ultrasonic transducer 54. The controller 200 may control, via a control signal, the high-energy ultrasonic transducer 54 to emit the ultrasonic wave to the fluid medium 10.

In some embodiments the high-energy ultrasonic transducer 54 includes an exciter that can excite elastic waves, for example, a piezoelectric member and an electro-acoustic transducer composed thereof, a magnetoelastic member and a magneto-acoustic transducer composed thereof, or a photoelastic member and a photo-acoustic transducer composed thereof. The first high-energy ultrasonic transducer array 310 and the second high-energy ultrasonic transducer array 320 constituting the 3D spatial acoustic beam array 300 are, for example, square arrays, annular arrays, and arbitrary shaped array capable of generating high-energy acoustic beam. The fluid medium is, for example, a liquid fluid medium or a soft medium, and in particular, is water, oil, a mixture of water and oil, a mixture of water, oil and various additives, various liquid, semi-solid, or colloidal flowing media.

In use, the controller 200 sends control signals to control the high-energy ultrasonic transducer 54 in the 3D spatial acoustic beam array 300 to emit ultrasonic wave, so that multiple ultrasonic wave beams are propagated in the fluid medium 10. The controller 200 may control the ultrasonic wave to reach a certain point at the same time through the control signals to generate focusing, thereby forming a high-energy sound beam. The controller 200 may control movement of the focusing position through the control signals, so that a scanning of the high-energy sound beams can be realized. The controller 200 may further send the control signals to control a size and a direction of the high-energy acoustic beams. The high-energy acoustic beams are radiated to the surface and the interior of the component 20, so that the high-energy acoustic beams cause an alternating stress in a residual stress concentration region in the component 20 by scanning of focusing. This alternating stress is superimposed with the residual stress. When the total stress is greater than the yield limit of the material of the component, the component 20 undergoes plastic deformation, and thus reducing and homogenizing the residual stress in the component 20.

In use, the fluid medium 10 in the container 40 is heated by the heater 400 arranged at the bottom of the container bottom 42. Without affecting the component 20, the fluid medium 10 can be heated to 65° C. When the temperature of the fluid medium 10 is 65° C., the propagation speed of the acoustic wave is the fastest, the acoustic pressure is the largest, and the residual stress reduction and homogenization efficiency is the highest. In use, the container 40 is hermetically closed, and the fluid medium 10 is pressurized by the pressure pump 500 arranged on the upper part of the container lid 43. In this way, the energy transmission loss of the ultrasonic wave is reduced, and the residual stress reduction and homogenization efficiency of the component 20 is improved.

In some embodiments, the control signals sent by the controller 200 are multi-channel pulse timing signals, and the time difference between the signals is used to control the arrival time of the ultrasonic wave front at a certain position in space to generate focusing.

In some embodiments, the control signals sent by the controller 200 are multi-channel continuous signals with adjustable frequency and amplitude. The excitation phase difference between the continuous signals is used to control the arrival time of the ultrasonic wave front at a certain position in space to generate energy superimposed focusing.

In some embodiments, the control signals sent by the controller 200 are, for example, mixed signals of multi-channel pulse timing signals and continuous signals with adjustable frequency and amplitude. The time difference and phase of each signal are used to generate a reverberant acoustic field with adjustable intensity in the liquid three-dimensional space. The continuous signals are modulated by pulse signals to form a multi-mode control manner.

Figure 14:
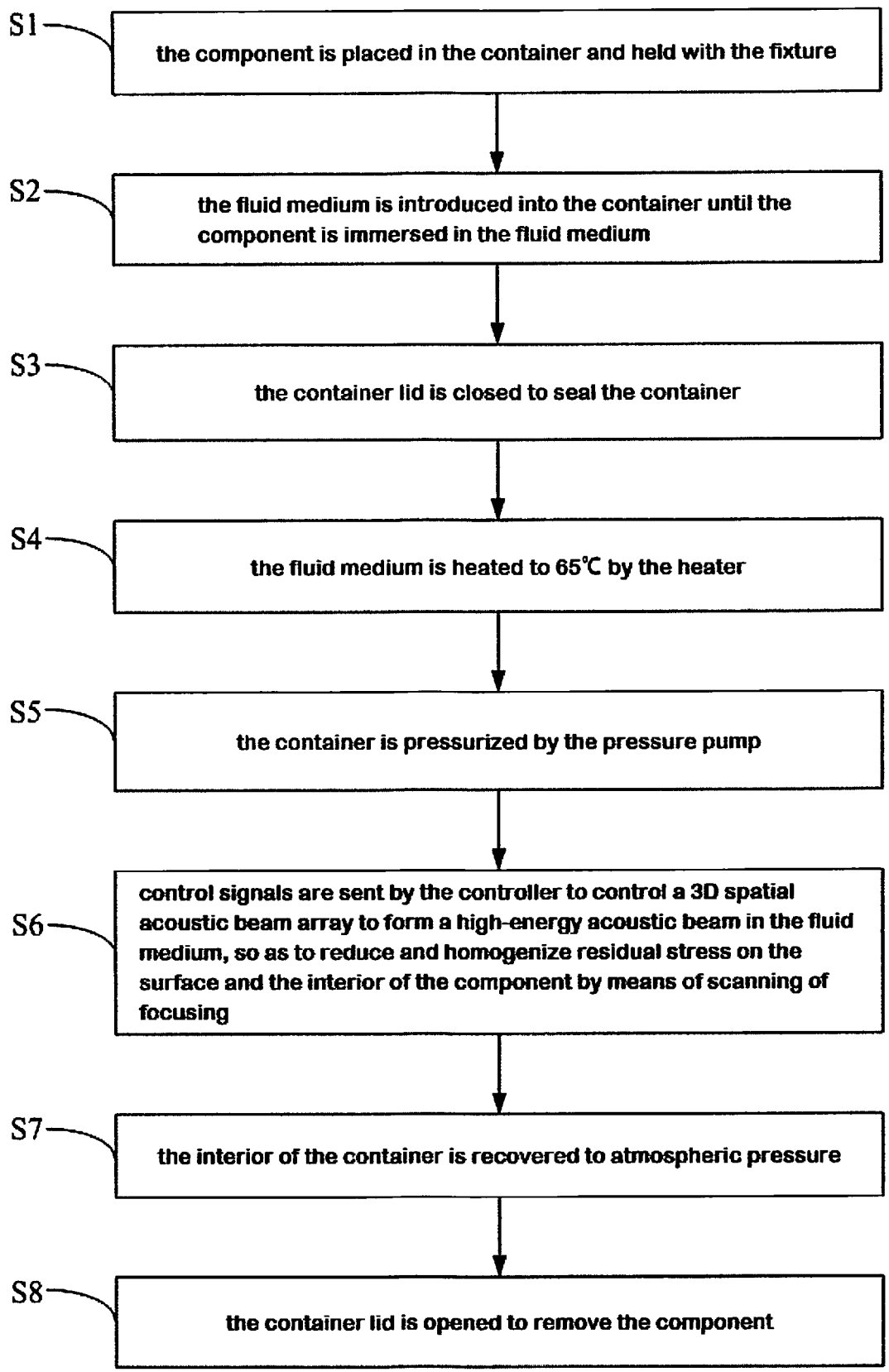
FIG. 14 is a flowchart of a method for reducing and homogenizing residual stress of a component based on the device in FIG. 13.

As shown in FIG. 14, this embodiment also provides a method for reducing and homogenizing residual stress of a component, which comprises steps S1 to S8.

In the step S1, the component 20 is placed in the container 40 and held with the fixture.

In the step S2, the fluid medium 10 is introduced into the container 40 until the component 20 is immersed in the fluid medium 10.

In the step S3, the container lid 43 is closed to seal the container 40.

In the step S4, the fluid medium 10 is heated to 65° C. by the heater 400.

In the step S5, the container is pressurized by the pressure pump 500.

In the step S6, control signals are sent by the controller 200 to control a 3D spatial acoustic beam array 300 to form a high-energy acoustic beam in the fluid medium 10, so as to reduce and homogenize residual stress on the surface and the interior of the component 20 by means of scanning of focusing.

In the step S7, the interior of the container 40 is recovered to atmospheric pressure.

In the step S8, the container lid 43 is opened to remove the component 40.

The above descriptions are merely some embodiments of the present disclosure and are not intended to limit the present disclosure. Those skilled in the art are able to make various modifications and changes to the disclosure. Any modification, equivalent replacement, or improvement made within the spirit and principle of this disclosure should be included in the protection scope of this disclosure.

What is claimed is:

1. A device for reducing and homogenizing residual stress of a component, comprising:
   a container containing a fluid medium;
   a member for suspending the component in the fluid medium;
   a plurality of acoustic wave generators arranged at different positions on a surface of the container and configured for emitting elastic waves to the fluid medium; and
   a control device for controlling directions, period of time and frequencies of the elastic waves emitted by the acoustic wave generator, wherein the elastic waves emitted by the acoustic wave generators are ultrasonic waves, and acoustic wave generators arranged in an array are provided on each of a container wall and a container bottom of the container to form a 3D spatial acoustic beam array, wherein each elastic wave signal constituting the array is emitted to regulation portion(s) of the component in a manner of scanning of focusing by the following control method: for each elastic wave signal constituting the array, a time of arrival of the ultrasonic wave front at a certain position in the space is controlled by an excitation phase difference of the signals to achieve the focusing.

2. The device as claimed in claim 1, wherein the array includes a square array, a circular array, a triangular array of or an annular array.

3. The device as claimed in claim 1, wherein the elastic waves emitted by the acoustic wave generators are ultrasonic waves, and each of the acoustic wave generators comprises a ultrasonic transducer, and an amplitude-adjusting pole arranged towards regulation portion(s) of the component, wherein one end of the pole is connected to the ultrasonic transducer and the other end of the pole is immersed in the fluid medium.

* * * * *